March 20, 1934. C. S. HASKINS 1,951,978
WEEDING TOOL
Filed Nov. 7, 1932
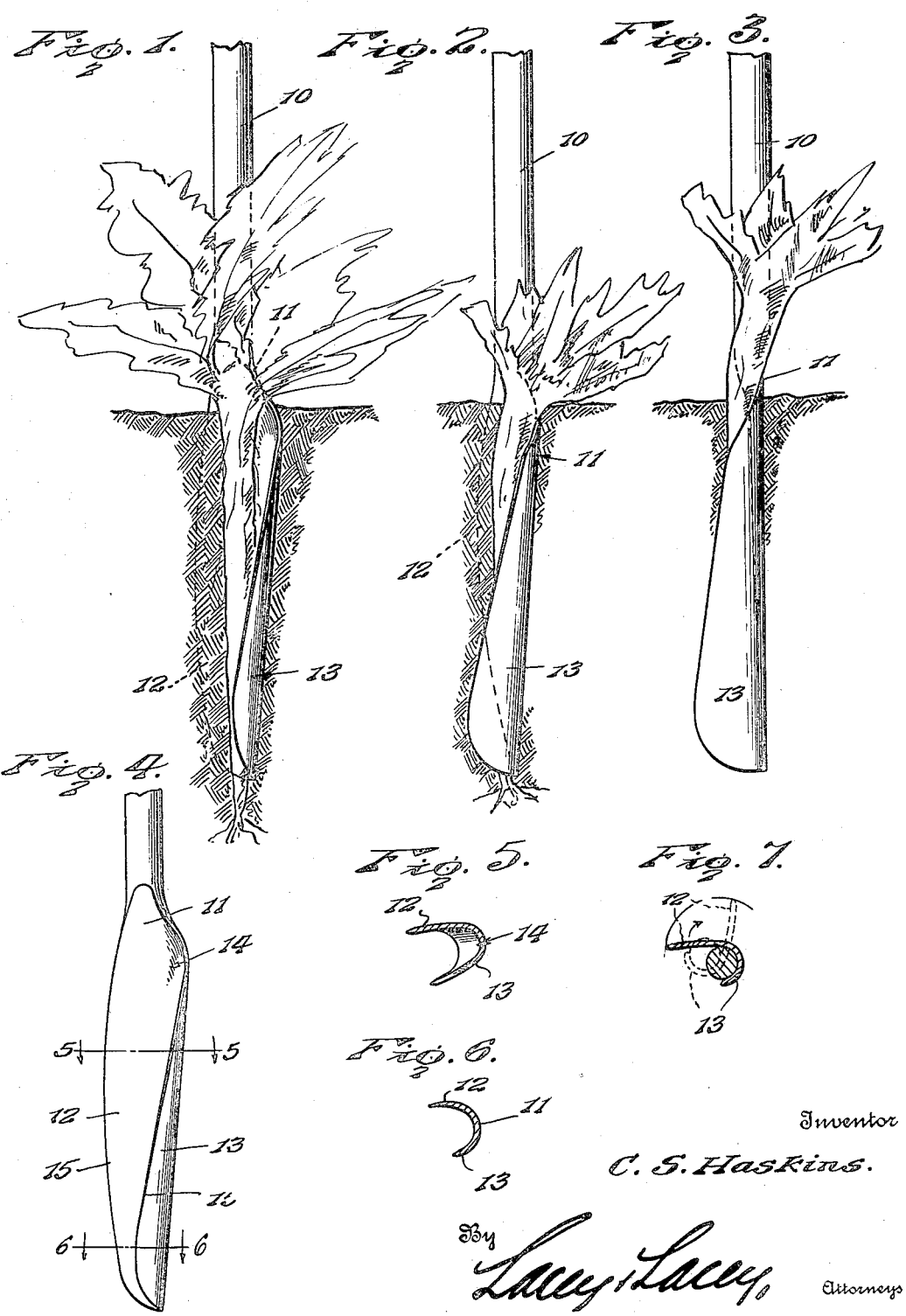
Inventor
C. S. Haskins.
By Lacey & Lacey, Attorneys Patented Mar. 20, 1934

1,951,978

UNITED STATES PATENT OFFICE 1,951,978

WEEDING TOOL

Charles S. Haskins, Uhrichsville, Ohio

Application November 7, 1932, Serial No. 641,655

1 Claim. (Cl. 55—65)

This invention relates to an improved weeding tool and seeks, among other objects, to provide a device of this character which may be easily and quickly operated manually for removing weeds from a lawn or the like.

The invention seeks, as a further object, to provide a device so constructed that the operation of the tool to remove a weed will result in a minimum of injury to the lawn.

A further object of the invention in this connection is to provide a device having companion cutters one of which will, when the device is pushed into the ground adjacent a root and then rotated, serve to push the dirt away adjacent the root to provide an open space or cavity, while the other cutter will function to crowd the root into said cavity and, at the same time, force the root upwardly with the result that, after the device has been rotated for a portion of a turn, the tool may be lifted upwardly for withdrawing the root from the ground.

And the invention seeks, as a still further object, to provide a device which, for deep roots, may be inserted into the ground for the major portion of the length of the blade and rotated in one direction for best results while, for shallow roots, may be inserted into the ground at the tip of the blade only and rotated in the opposite direction for best results.

Other and incidental objects, not specifically mentioned in the foregoing, will be apparent during the course of the following description.

In the accompanying drawing forming part of this specification:

Figure 1 is a side elevation showing the initial position of the device when inserted into the ground adjacent the root of a weed to be removed, Figure 2 is a similar view showing the device partially rotated, Figure 3 is a view similar to Figures 1 and 2 and showing the device still further rotated, Figure 4 is a detail elevation particularly showing the blade of the tool, Figure 5 is a transverse section on the line 5—5 of Figure 4, Figure 6 is a transverse section on the line 6—6 of Figure 4, and Figure 7 is a sectional view showing the action of the blade when rotated in use.

In carrying the invention into effect, I employ a preferably straight cylindrical shank 10 which may be of any approved length and diameter and is preferably provided at its upper end with a conventional eye or handle, not shown. At its lower end portion, the shank is flattened to provide a relatively thin blade 11 initially of uniform width and having rounded lower corners. As particularly shown in Figure 4, the blade is twisted from top to bottom along a diagonal line to form a pair of arcuate cutters 12 and 13, respectively, the blade being substantially concavo-convex in cross section. Thus, it will be seen, a diagonal channel 14 lies between the cutters while the cutter 12 is widest at its upper end and tapers in width to its lower end and the cutter 13 is widest at its lower end and tapers in width to its upper end. The cutters are each provided with cutting edges 15 which merge at the tip of the blade.

In use, the blade is, as shown in Figure 1, pushed into the ground immediately adjacent the root to be removed, when the device is rotated in a clockwise direction. As the blade is revolved, the back of the cutter 12 will, as shown in Figure 7, push the dirt away from the root so that by the time the blade has reached the position illustrated in dotted lines, a cavity will be provided immediately adjacent the root. At the same time, the cutter 13 will, as the blade is revolved, tend to crowd the root into said cavity so that, after the blade has been revolved substantially a single turn, the root will be thoroughly loosened.

Figure 2 shows the blade rotated approximately 30° from the position illustrated in Figure 1 and attention is now directed to the fact that as the cutter 12 is gradually widened towards its upper end, the cavity formed by this cutter becomes gradually larger proportionately towards the top of the ground, the cavity being smallest at its lower end. Furthermore, it is to be noted that as the blade is turned, the wide lower end of the cutter 13 tends to crowd a disproportionate quantity of earth into the small lower end of the cavity made by the narrow end of the cutter 12. Accordingly, the small lower end of the cavity is filled by the cutter 13 with loose earth but the quantity of earth crowded into the cavity gradually diminishes toward the top of the ground due to the taper of the cutter 13. As a result the root being removed is not only crowded sidewise into the cavity but is also forced up by the action of the cutter 13 in filling the cavity from the bottom up so that by the time the blade has been rotated to the position shown in Figure 3, the root has not only been thoroughly loosened but has been raised from its initial position to lie firmly in the channel 14 of the blade. Accordingly, by then pulling upwardly on the tool, the blade may be withdrawn for removing the root therewith.

For deep roots, such as those found on the dandelion, the blade is, as shown in the drawing, pushed into the ground practically for its entire length and, as previously described, is rotated in a clockwise direction. For shallow roots, however, such as is found on plantain, the tip only of the blade is pushed into the ground adjacent the root, when the tool is turned in a counter-clockwise direction. A shallow cavity is thus made by the wide end of the cutter 13, as the tool is revolved, while the narrow end of the cutter 12 will cause a loosening of a minimum quantity of earth to effect removal of the root. Undue injury of a lawn may thus be avoided.

Having thus described the invention, I claim:

A weeding tool including a channel-shaped blade having smooth inner and outer faces and having the metal thereof twisted from the tip of the blade to a point on one longitudinal edge thereof along a diagonal line to provide oppositely tapered cutters, one decreasing in width toward the lower end of the blade and the other increasing in width toward the lower end of the blade, the cutters merging into a rounded edge at the lower end of the blade and the latter cutter merging into a rounded edge at the upper end of the blade.

CHARLES S. HASKINS. [L. S.]